(12) United States Patent
Leppard

(10) Patent No.: US 7,913,114 B2
(45) Date of Patent: Mar. 22, 2011

(54) REPAIR OF A CORRUPT DATA SEGMENT USED BY A DE-DUPLICATION ENGINE

(75) Inventor: Andrew Charles Leppard, Greenacres (AU)

(73) Assignee: Quantum Corporation, San Jose, CA (US)

( * ) Notice: Subject to any disclaimer, the term of this patent is extended or adjusted under 35 U.S.C. 154(b) by 307 days.

(21) Appl. No.: 12/183,792

(22) Filed: Jul. 31, 2008

(65) Prior Publication Data
US 2010/0031086 A1 Feb. 4, 2010

(51) Int. Cl.
*G06F 11/00* (2006.01)
(52) U.S. Cl. ......................................................... 714/15
(58) Field of Classification Search ....................... 714/15
See application file for complete search history.

(56) References Cited

U.S. PATENT DOCUMENTS

| | | | |
|---|---|---|---|
| 6,381,241 B1* | 4/2002 | Ghirnikar et al. | 370/394 |
| 7,624,335 B1* | 11/2009 | Maheshwari et al. | 714/807 |
| 7,650,341 B1* | 1/2010 | Oratovsky et al. | 707/999.01 |
| 2005/0154615 A1* | 7/2005 | Rotter et al. | 705/3 |
| 2006/0253418 A1* | 11/2006 | Charnock et al. | 707/1 |
| 2006/0271526 A1* | 11/2006 | Charnock et al. | 707/3 |
| 2008/0098236 A1* | 4/2008 | Pandey et al. | 713/189 |
| 2008/0104146 A1* | 5/2008 | Schwaab et al. | 707/204 |
| 2009/0083610 A1* | 3/2009 | Arai et al. | 714/807 |
| 2009/0182789 A1* | 7/2009 | Sandorfi et al. | 707/204 |
| 2009/0193223 A1* | 7/2009 | Saliba et al. | 711/216 |
| 2009/0204636 A1* | 8/2009 | Li et al. | 707/103 Y |
| 2009/0234892 A1* | 9/2009 | Anglin et al. | 707/201 |
| 2009/0319720 A1* | 12/2009 | Stefanus et al. | 711/103 |
| 2010/0037118 A1* | 2/2010 | Saliba et al. | 714/752 |

OTHER PUBLICATIONS

Newman, Henry "Data Corruption: Dedupe's Achilles Heal" enterpriseITplanet.com, Jul. 22, 2008.*
eWeek, "What is the difference between data deduplication, file deduplication and data compression?" eWeek.com Aug. 15, 2007.*
"An in-depth look at data deduplication methods" searchdatabackip.com 2008.*
"DXi-Series Disk Backup Systems with Data De-Duplication: Providing Comprehensive Data and System Integrity", *Quantum Technical Brief,* www.quantum.com,(2007).

* cited by examiner

*Primary Examiner* — Bryce P Bonzo
(74) *Attorney, Agent, or Firm* — Baker Botts L.L.P.

(57) ABSTRACT

In a method for repairing a corrupt data segment used by a de-duplication engine, a data segment indexed by a de-duplication index is identified as being as a corrupt data segment. A search is made to find a duplicate data segment with which to replace the corrupt data segment, where the duplicate data segment comprises an uncorrupted version of the data segment. The corrupt data segment is replaced with the duplicate data segment.

23 Claims, 5 Drawing Sheets

400

```
┌─────────────────────────────────────────────────────────────────┐
│  IDENTIFY A DATA SEGMENT INDEXED BY A DE-DUPLICATION INDEX AS A │
│                    CORRUPT DATA SEGMENT.                        │
│                             410                                 │
└─────────────────────────────────────────────────────────────────┘
                                │
                                ▼
┌─────────────────────────────────────────────────────────────────┐
│  SEARCH FOR A DUPLICATE DATA SEGMENT WITH WHICH TO REPLACE THE  │
│  CORRUPT DATA SEGMENT, THE DUPLICATE DATA SEGMENT COMPRISING AN │
│         UNCORRUPTED VERSION OF THE DATA SEGMENT.                │
│                             420                                 │
└─────────────────────────────────────────────────────────────────┘
                                │
                                ▼
┌─────────────────────────────────────────────────────────────────┐
│    REPLACE THE CORRUPT DATA SEGMENT WITH THE DUPLICATE DATA     │
│                          SEGMENT.                               │
│                             430                                 │
└─────────────────────────────────────────────────────────────────┘
```

FIG. 4

REPAIR OF A CORRUPT DATA SEGMENT USED BY A DE-DUPLICATION ENGINE

BACKGROUND

In a data storage system, often a large portion of data stored is repetitive data. Repetitive data is data which is potentially unnecessarily duplicated within the data storage system. Consider an example where an electronic message ("e-mail") is sent to 100 recipients, it may be stored 100 times in a data storage system. All but the first instance of this e-mail constitute some amount of repetition. In another example, multiple copies of slightly different versions of a word processing document are stored in a data storage system. A large portion of each of the documents is likely to constitute repetition of data stored in conjunction with one or more of the other instances of the word processing document.

De-duplication is sometimes used to reduce the amount of repetitive data stored in a data storage system. De-duplication often involves hashing data segments to identify duplicate data segments, then replacing an identified duplicate data segment with a smaller reference such as a pointer, code, dictionary count, or the like, which references a data segment, pointer, or the like stored in or referenced by a de-duplication library or index. In this manner, typically one copy of a duplicated data segment is saved and indexed as a reference, thus allowing other instances of the data segment to be deleted and replaced with a reference or pointer to the indexed data segment. By removing duplicated data in this fashion, storage efficiency can be improved and considerable space can be freed up within a data storage system.

However, if an indexed data segment becomes corrupted, such as due to a media failure or some other reason, the impact of the corruption is not typically limited to the single corrupt data segment. Instead, the scope of the problems caused by the corruption are be multiplied by the number of times that the data segment has been referenced to de-duplicate data segments elsewhere in the data storage system. For example, it is possible for a heavily used or popular data segment to be present in, and thus de-duplicated from, thousands or millions of locations within a data storage system. In such a case, all of the thousands or millions of storage locations which were de-duplicated would become corrupt if the data segment which was referenced to de-duplicate those locations became corrupted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a method for repairing a corrupt data segment used by a de-duplication engine, a data segment indexed by a de-duplication index is identified as being as a corrupt data segment. A search is made to find a duplicate data segment with which to replace the corrupt data segment, where the duplicate data segment comprises an uncorrupted version of the data segment. The corrupt data segment is replaced with the duplicate data segment.

DESCRIPTION OF THE DRAWINGS

The accompanying drawings, which are incorporated in and form a part of this specification, illustrate embodiments of the subject matter and, together with the description, serve to explain principles discussed below.

FIG. 4 shows flow diagram of an example method for repairing a corrupt data segment used by a de-duplication engine, according to an embodiment.

Figure 1:
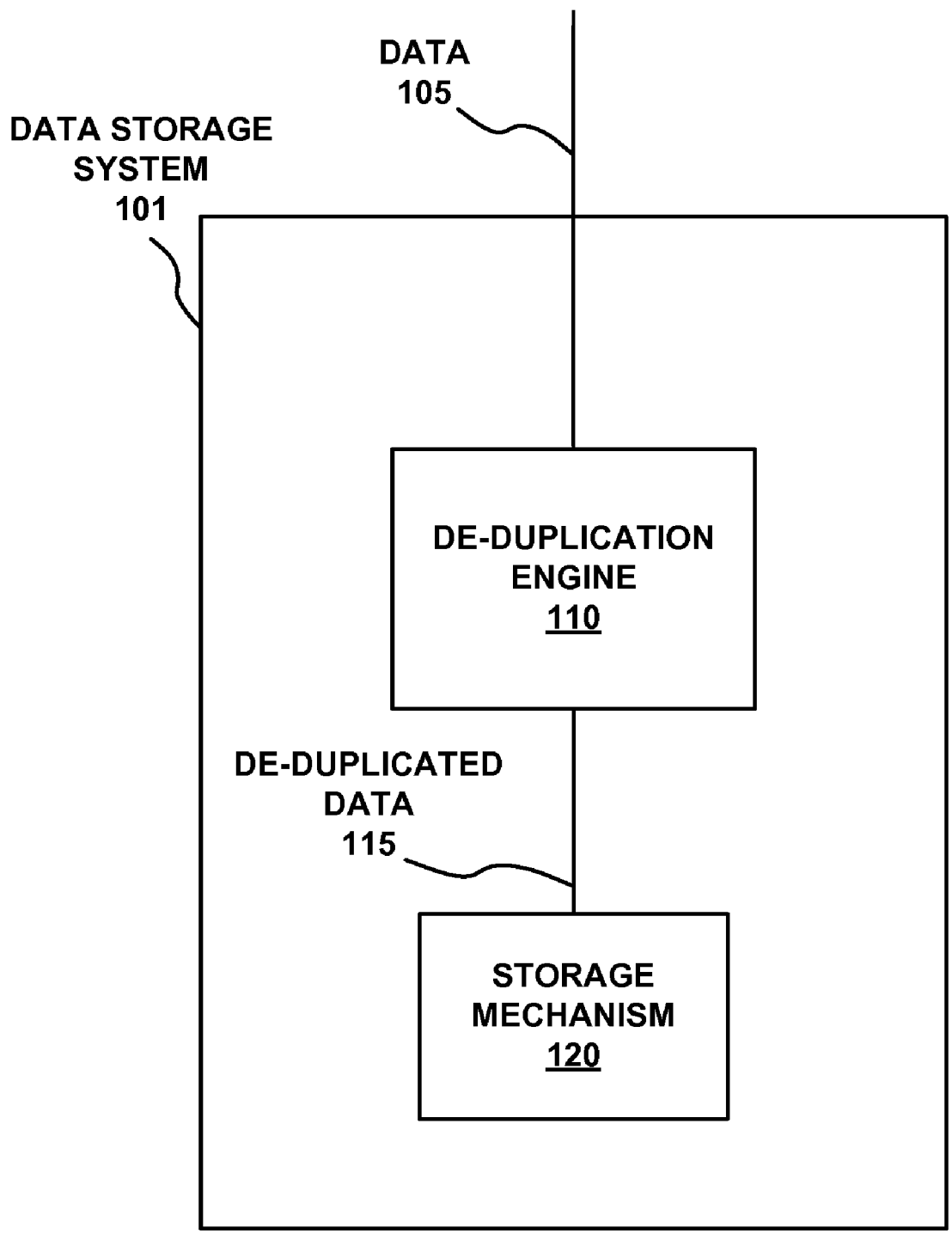
FIG. 1 is a block diagram of an example data storage system, in accordance with an embodiment.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "identifying," "searching," "replacing," "setting," "performing," "storing," "producing," "comparing," "monitoring," "checking," "generating," "re-generating," "determining," or the like, refer to the actions and processes of a computer system, de-duplication engine, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices. In some embodiments, as described herein, a de-duplication engine resides within and/or is coupled with a data storage system or a computer system. In some embodiments, a de-duplication engine, as described herein, is implemented all or in part as a hardware device, such as a circuit card, circuit board, or an application specific integrated circuit. In some embodiments, a de-duplication engine, as described herein, is implemented all or in part as a virtual device in the form of computer executable instructions executed on a processor to cause the processor to perform one or more functions of the de-duplication engine.

Overview of Discussion

In storage systems, communication systems, and other devices, systems, and situations which use data de-duplication, a data segment is typically indexed in some manner and then referenced to de-duplicate duplicate data segments which are identical to the data segment. This index and the data segment are typically maintained in or referenced by the de-duplication engine which uses the data segment to perform de-duplication and to reconstruct/reproduce original data when such de-duplicated data is retrieved from storage. Corruption of a data segment used by a de-duplication engine can cause corruption of numerous data segments which have been de-duplicated with reference to the data segment which has become corrupted.

One way around this problem is to store two or more copies of all data as reference, in case one copy becomes corrupted. Unfortunately, this severely impacts the efficiency of data de-duplication as it doubles the amount of data stored, which effects both speed performance and efficiency of de-duplication. Moreover, if data is not highly repetitive (and thus conducive to high efficiencies of de-duplication), storage of multiple copies of all or much of the data as reference can actually cause data de-duplication to use more storage space for storing data than would be used if no de-duplication had been performed.

Another technique to deal with a corrupted data segment used by a de-duplication engine, which doesn't suffer from this ballooning storage problem, is described herein. In brief, this technique involves identifying that a particular data segment used by the de-duplication engine is corrupted. A search is made for a duplicate data segment that is accidentally or perhaps purposely maintained in or referenced by a de-duplication index and/or a search is made for a duplicate that may appear within information which is being processed for de-duplication. A duplicate can be recognized, in one embodiment, when another data segment hashes to the same hash value that was previously stored in association with the data segment which has become corrupted. When a duplicate data segment is found, it is used to replace the corrupted version of the data segment.

As described herein a data segment includes a data file, a sub-block of a data file or other data block, and/or a collection of sub-blocks. In various embodiments, data segments can vary in length or be of uniform length, depending upon nuances of the de-duplication which is used and particular operation of a de-duplication engine. A sub-block comprises a natural or a deterministic sub-portion of the data of a larger data block such as a Binary Large Object (BLOB). For example, in one embodiment with respect to a word processing file which comprises a data block, a sub-block can comprise a smaller portion of the data of the data block. The size of this smaller portion of the data block can be of some pre-determined length (which may vary) or can be determined by occurrence of some data, event, or symbol within the data block, such as occurrence of a period or a carriage return. It is appreciated that these are only some examples of the formation of sub-blocks and that other mechanisms and techniques may be used to break data files or blocks into smaller sub-blocks.

Discussion will begin with a description of an example data storage system and a de-duplication engine with which, or upon which, embodiments described herein may operate. Components of the data storage system and the de-duplication engine will be described. Operation of an example de-duplication engine will then be described in more detail in conjunction with a description of an example method for repairing a corrupt data segment used by a de-duplication engine.

Example Data Storage System

FIG. 1 is a block diagram of an example data storage system 101, in accordance with an embodiment. As shown in FIG. 1, in one embodiment, data storage system 101 comprises a de-duplication engine 110 which is communicatively coupled with a storage mechanism 120. Data 105, which comprises one or more data segments, is received for storage by storage system 101. Within data storage system 101, data 105 is received by de-duplication engine 110, which performs de-duplication on received data 105 to remove some amount of duplicated data segments and produce de-duplicated data 115. After storage in storage mechanism 120 as de-duplicated data 115, all or a portion of data 105 can accessed from or provided by data storage system 101. When data 105 is accessed or provided, in one embodiment, de-duplication engine 110 operates in reverse to reconstruct data 105 from de-duplicated data 115 which is stored in storage mechanism 120.

Storage mechanism 120 comprises at least one data storage mechanism, and in some embodiments comprises a plurality of data storage mechanisms. Storage mechanism 120 can comprise a variety of data storage mechanisms. In one embodiment, for example, storage mechanism 120 comprises at least one hard disk drive. In one embodiment, storage mechanism 120 comprises at least one tape drive. In one embodiment, storage mechanism 120 comprises storage in a volatile or non-volatile solid state storage, such as, for example a data cache, memory, or solid state mass storage. In one embodiment, storage mechanism 120 comprises a plurality of disks or other storage devices arranged in a redundant storage array which offers data protection, such as a redundant array of independent disks (RAID).

De-duplication engine 110 operates to perform de-duplication of data stored in storage mechanism 120 and to repair corrupt data segments which it uses in the performance of de-duplication. Techniques for data de-duplication are well known in the art. However, in general, de-duplication engine 110 identifies a duplicated data segment within data 105 by a technique, such as, for example, hashing the data segment to obtain a hash value associated with the data segment. This hash value is then compared to other hash values generated from other data segments of data 105 and and/or other hash values which have previously been generated for data which has already been processed for de-duplication and stored within storage mechanism 120. The hash is a cryptographic mechanism for producing a code or data string (the hash value) which represents the data. When an appropriate hash is used, a sufficiently long hash value is generated which is very likely to be unique to a particular data segment. By making the statistical likelihood of uniqueness high enough, data segments which hash to matching hash values can be assumed to be identical data segments.

During data de-duplication, all but one of a plurality of identical data segments can be deleted and replaced with a reference, code, pointer or the like which directs to an unaltered copy of the data segment which is maintained in data storage system 101 or at some other location. In various embodiments, this copy of the data segment can be stored in a data segment storage, which can be located in storage mechanism 120, in de-duplication engine 110, and/or in some other storage mechanism or location. In some embodiments, multiple copies of the data segment may be stored and/or indexed by de-duplication index 240. In some embodiments, the hash value (or some portion thereof) which is associated with the data segment is stored in a de-duplication index with a code or a pointer which references the storage location of the data segment. In other embodiments, the hash value (or some portion thereof) is stored at a location separate from the pointer, such as with the data segment.

Figure 2:
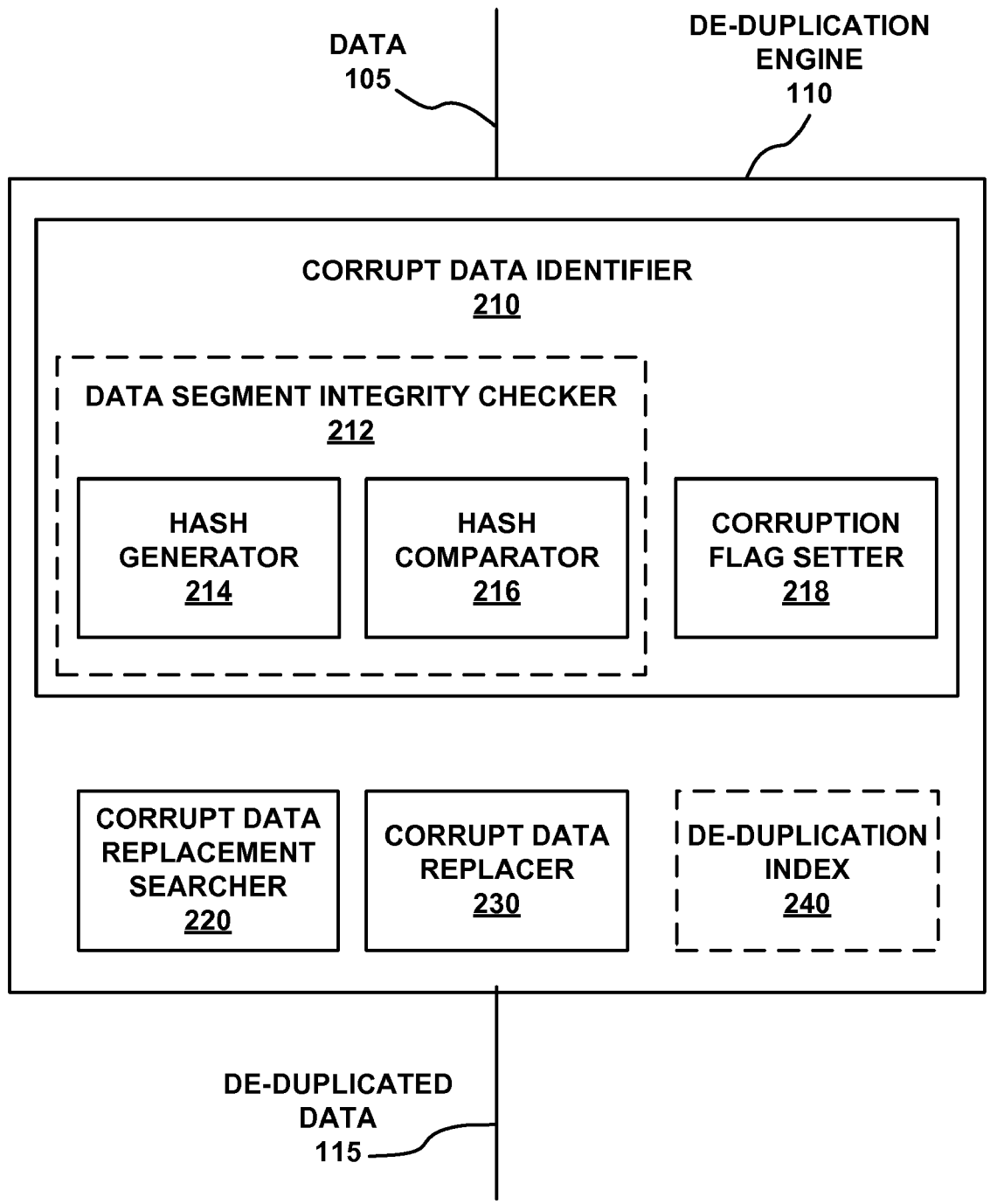
FIG. 2 shows block diagram of an example de-duplication engine, according to an embodiment.

FIG. 2 shows a block diagram of an example de-duplication engine, according to an embodiment. As shown in FIG. 2, in one embodiment, de-duplication engine 110 comprises corrupt data identifier 210, corrupt data replacement searcher 220, corrupt data replacer 230, and de-duplication index 240; all of which are communicatively coupled with one another, to facilitate interoperation and the exchange of information within de-duplication engine 110. These illustrated components/modules operate identify and repair a corrupt data segment used by de-duplication engine 110 during de-duplication of data 105 into de-duplicated data 115.

It is appreciated that the functions performed by the illustrated components/modules of de-duplication engine 110 can, in some embodiments, be consolidated, split apart, and even performed by additional components/modules. It is also appreciated that, in some embodiments, de-duplication engine 110 can have a greater number of components, lesser number of components, and/or different components/modules than those illustrated in FIG. 1. However, for clarity of explanation, the functions of the components/modules of de-duplication engine 110 will be described as if they are solely associated with the components/modules which are illustrated in FIG. 2.

Corrupt data identifier 210 operates to identify a data segment as being a corrupt data segment. The data segment is one which is indexed by a de-duplication index, such as de-duplication index 240. In various embodiments, the data segment can comprise a file, a data block, a sub-block, or some other unit of data for which a hash value has been previously generated. The data segment is identified as being a corrupt data segment in response to a failed integrity check of the data segment. For example, during operation of de-duplication engine 110 a data segment is likely be accessed to de-duplicate data, to reconstruct de-duplicated data, or for other reasons. During such access events, which can randomly or sporadically occur, the data segment is re-hashed and the resultant hash value is compared to a hash value which has previously been stored in association with the data segment. In some embodiments, the previously stored hash value is the original hash value which was hashed from the data segment. If the data segment has become corrupted for any reason (e.g., overwriting with other data, media failure, etc.) then the re-generated hash value will not match the previously generated hash value. Such a determination causes corrupt data identifier to mark the data segment so that it is identified as a corrupt data segment.

In one embodiment, corrupt data identifier 210 also comprises data segment integrity checker 212, which it uses for performing a scheduled integrity check on a data segment. When included, data segment integrity checker 212 is used by corrupt data identifier to perform routine and systematic integrity checks upon data segments which are indexed or referenced by de-duplication index 240 and utilized by de-duplication engine 110 to perform data de-duplication. Thus, instead of relying upon a perhaps random integrity check to determine that a data segment is corrupt, corrupt data identifier 210 uses data segment integrity checker 212 to perform systematic, routine, and/or ongoing integrity checks of data segments utilized for de-duplication by de-duplication engine 110. Such integrity checks can be scheduled, such as, for example to occur at a particular interval, at a particular time of day (such as when a data storage system is anticipated to experience less use), in accordance with an event (such as a backup), and/or according to some other schedule.

In one embodiment, data segment integrity checker 212 comprises a hash generator 214 and a hash comparator 216. Hash generator 214 re-generates a hash value of a data segment according to the same cryptographic hash which is used by de-duplication engine 110. Hash comparator 216 compares the re-generated hash value to a previously generated hash value (or portion thereof) which is stored and associated with the data segment for which the re-generated hash value has been generated. If the comparison performed by hash comparator 216 indicates that the hash value and re-generated hash value are identical, then hash comparator 216 determines that the data segment is not corrupt. If the comparison performed by hash comparator 216 indicates that the hash value and re-generated hash value are different, then hash comparator 216 determines that the data segment is corrupted and a notification is provided to corrupt data identifier 210 so that the data segment can be identified or marked as being a corrupt data segment.

In one embodiment, corrupt data identifier 210 includes a corruption flag setter 218 which operates to set a flag, such as a corruption flag, associated with the data segment or to otherwise mark or identify that a corrupt data segment is corrupt. In one embodiment, the corruption flag comprises one or more bits in a de-duplication index and/or data segment storage that are associated with the identified data segment. Corruption flag setter sets the flag when the data segment has been determined to be corrupt. In one embodiment, corruption flag setter also resets the flag when the data segment is determined not to be corrupt and/or in response to a corrupted data segment being repaired.

Corrupt data replacement searcher 220 checks de-duplication index 240 for a duplicate and uncorrupted version of the corrupted data segment and/or monitors ongoing and future data de-duplication processes performed by de-duplication engine 110 to find a duplicate and uncorrupted version of the data segment. The checking and monitoring are performed by checking and/or monitoring for a hash value (or portion thereof) which is identical to the hash value which has been previously stored in association with the now corrupted data segment. Corrupt data replacement searcher 220 performs such data segment searching in response to the identification of a data segment as being corrupt. Thus, if a plurality of data segments is flagged as corrupt, corrupt data replacement searcher 220 searches for data segments which are duplicates of the non-corrupted versions of the data segments which have been identified as being corrupt.

Typically a data de-duplication index, such as de-duplication index 240, indexes or strives to index only unique data segments. However, in some embodiments a duplicate of a corrupted data segment may exist within or be indexed by de-duplication index 240. Some non-limiting examples of situations in which multiple copies of identical data segments may exist within or be indexed by a de-duplication index include, a time prior to an update of the de-duplication index and/or a situation in which some or all index data has been lost. In one embodiment, where both the checking and monitoring are performed, corrupt data replacement searcher 220 first checks the de-duplication index to see if a duplicate data segment can be immediately found. If a duplicate data segment to the corrupt data segment is not found by searching the de-duplication index corrupt data replacement searcher 220, then monitors on-going and future de-duplication processes for the occurrence of a duplicate data segment with which to replace the corrupt data segment. In one embodiment, when corrupt data replacement searcher 220 finds a duplicate and uncorrupted data segment with which to replace a corrupt data segment, information regarding the duplicate data segment is provided to corrupt data replacer 230.

In one embodiment, corrupt data identifier 210 instructs corrupt data replacement searcher 220 to check de-duplication index 240 for a duplicate data segment prior to setting a flag or other indicia that the data segment is corrupt. If the duplicate data segment is not found by checking de-duplication index 240, corrupt data identifier 210 sets the corrupt data flag. After the corrupt data flag is set, corrupt data replacement searcher 220 monitors the de-duplication process for an occurrence of a duplicate data segment.

Corrupt data replacer 230 replaces a corrupt data segment with a duplicate data segment which has been found by corrupt data replacement searcher 220. The replacing can comprise overwriting the corrupt data segment with the uncorrupt data of the duplicate data segment or redirecting a pointer, such as a pointer in de-duplication index 240, to point to the uncorrupted duplicate data segment rather than to the corrupt data segment. Either of these actions acts to repair the corrupt data segment. In one embodiment, following the repair, corrupt data replacer 230 resets a corruption flag, mark, or other indicia which was used to identify that the data segment was corrupt.

In one embodiment, de-duplication engine 110 comprises de-duplication index 240. De-duplication index 240 can be maintained all or in part in cache memory associated with de-duplication index 240 or at a storage location (such as within storage mechanism 120) which is associated with de-duplication index 240. In other embodiments, de-duplication index 240 is maintained separately from de-duplication engine 110 and is accessed by or linked to de-duplication engine 110. In one embodiment, de-duplication index 240 comprises an index of data segment identifiers which are associated with a plurality of data segments which have been used for de-duplicating other data segments during a de-duplication process performed by de-duplication engine 110. For example, a data segment which has been identified as a corrupt data segment by data segment integrity checker 212 (or some other integrity checking process) comprises one of the plurality of data segments which are indexed by de-duplication index 240. In one embodiment, the identified data segments are all or nearly all unique and thus all or nearly all of the data segment identifiers are also unique. In one embodiment, a data segment identifier of de-duplication index 240 comprises a hash value that has been generated from and for the data segment, such as during a de-duplication process.

Figure 5:
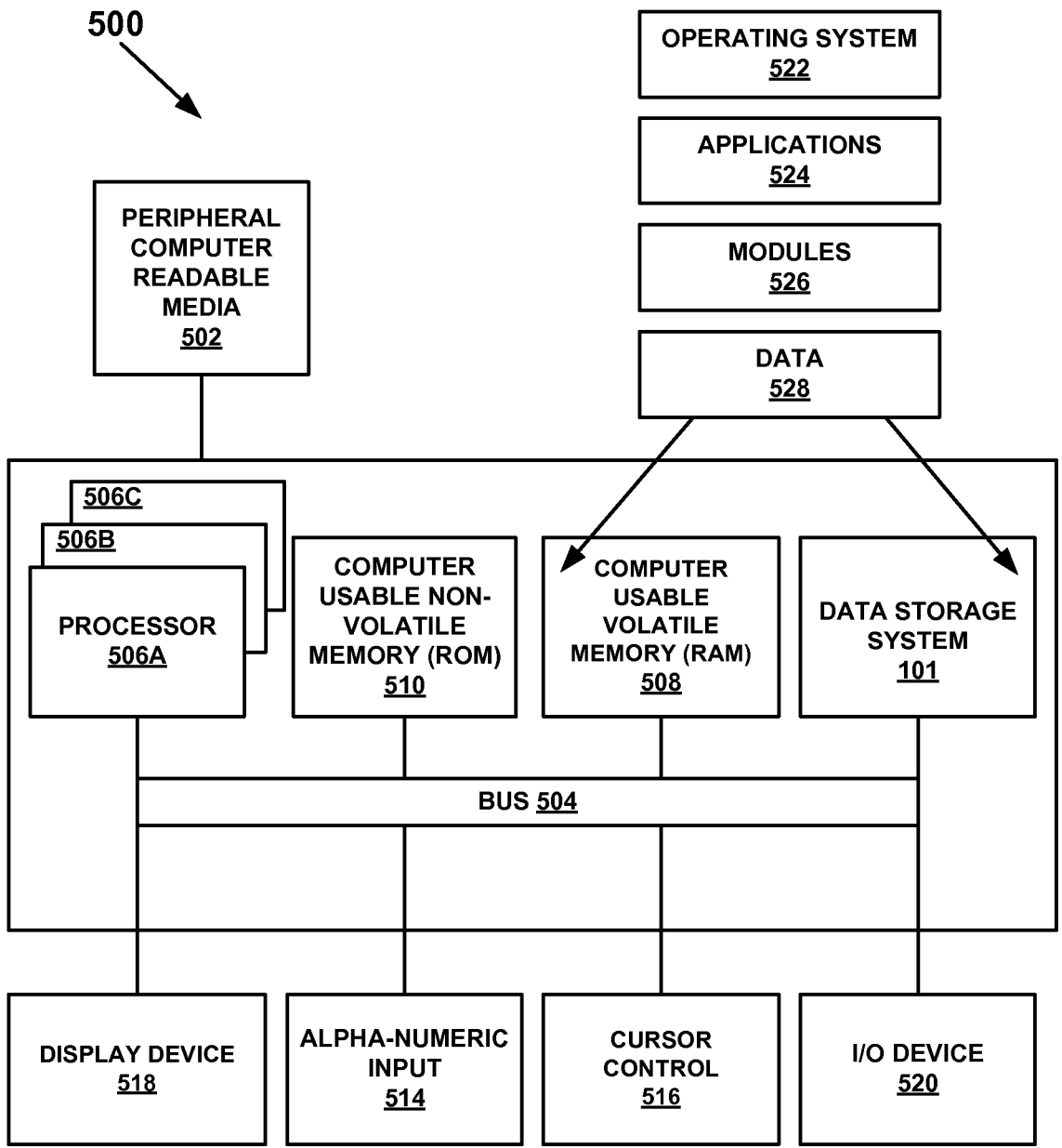
FIG. 5 shows a block diagram of an example computer system with which or upon which an embodiment described herein can be practiced.

In one embodiment, de-duplication engine 110 is implemented all or in part as a hardware device such as an Application Specific Integrated Circuit (ASIC), integrated circuit, data storage system controller card/board (e.g., a RAID controller), circuit card/board or the like. In other embodiments, all or some portion of the functionality of de-duplication engine 110 can comprise a virtual device implemented as instructions which are executed by a processor, such as a microcontroller/processor of a data storage system controller card/board, or such as a processor of computer system 500 (FIG. 5). This virtual device performs all or some part of the functions of the components/modules of de-duplication engine 110. In an embodiment where all or a portion of de-duplication engine 110 is being implemented as a virtual device, the processor, when executing instructions read from a computer readable medium, performs a function of at least one component/module (e.g., corrupt data identifier 210, corrupt data replacement searcher 220, corrupt data replacer 230, and/or de-duplication index 240) of de-duplication engine 110.

Figure 3:
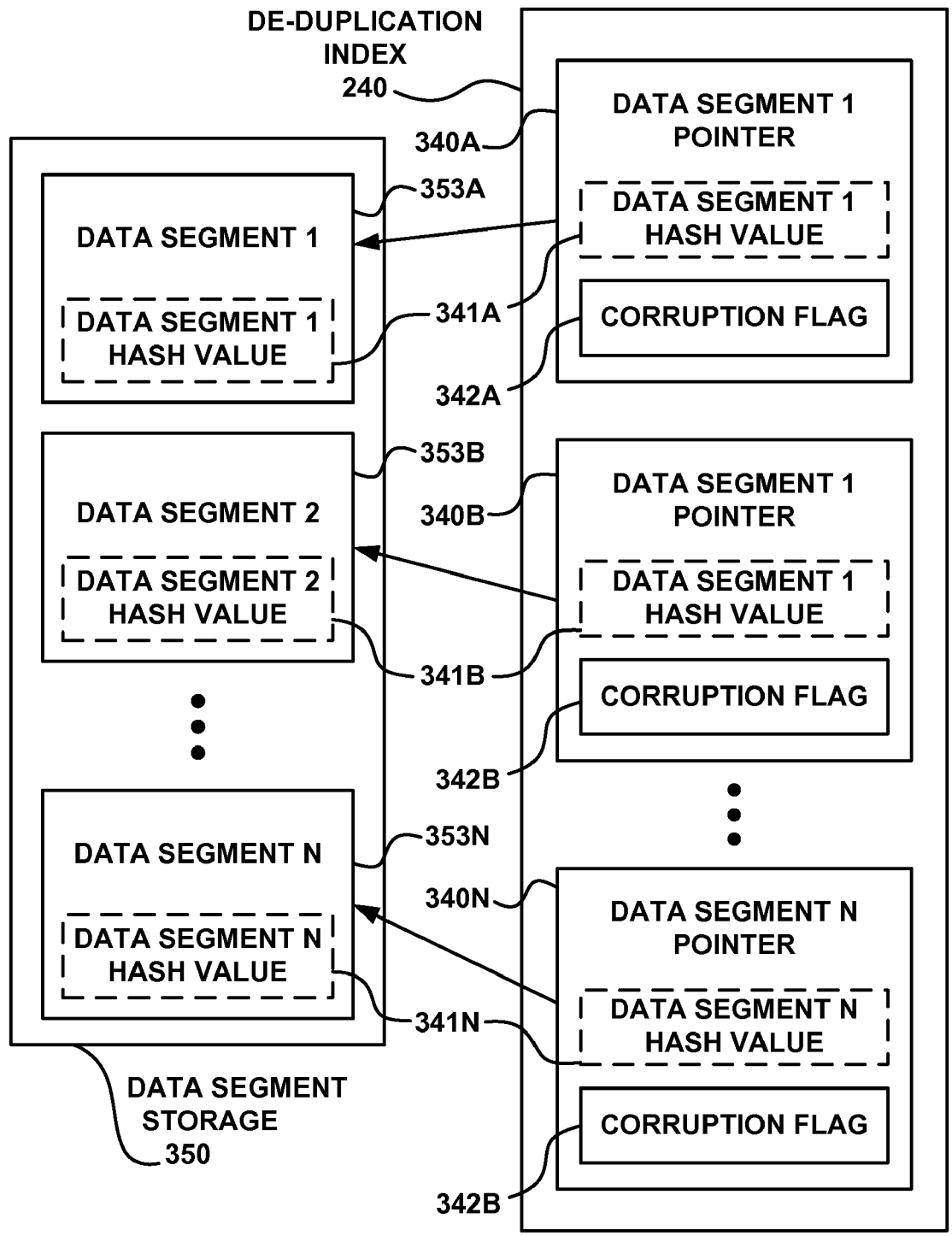
FIG. 3 shows an example block diagram of a de-duplication index and a data segment storage, according to an embodiment.

FIG. 3 shows an example block diagram of de-duplication index 240 and a data segment storage 350, according to an embodiment. In one embodiment, data segment storage 350 comprises a storage location, such as a data cache or a portion of storage mechanism 120 which is set aside for storing data segments which are used by de-duplication engine 110 for data de-duplication. In one embodiment, data segment storage 350 comprises a collection of the storage locations at which original/reference data segments have been stored during the ordinary course of storing de-duplicated data 115. As shown in FIG. 3, in one embodiment de-duplication index 240 comprises a plurality of data segment pointers 340A, 340B, 340N, which each point to storage location of a particular data segment (of a plurality of data segments) which is referenced for use in data de-duplication performed by de-duplication engine 110. For example, data segment pointer 340A points to or references the storage location of data segment 353A in data segment storage 350; data segment pointer 340B points to or references the storage location of data segment 353B in data segment storage 350; and data segment pointer 340N points to or references the storage location of data segment 353N in data segment storage 350.

In one embodiment, a data segment identifier (341A, 341B, 341N), such as a hash value, is associated with a data segment. This can comprise storing the data segment identifier (341A, 341B, 341N) with the data segment which it identifies, in de-duplication index 240, or in both locations. In the embodiment illustrated by FIG. 3, data segment identifiers 341A, 341B, and 341N are illustrated as hash values. Each data segment identifier 341A, 341B, 341N is stored either in conjunction with its associated data segment (353A, 353B, 353N) or in de-duplication index 240 in association with a pointer (340A, 340B, 340N) to a data segment represented by a respective data segment identifier, or in both locations. It is appreciated that in other embodiments, a data segment identifier may be stored at some other location which is not depicted in FIG. 3.

In one embodiment, de-duplication index 240 comprises a corruption flag (342A, 342B, 342N) associated with each data segment. Setting a corruption flag, such as corruption flag 342A, identifies that an associated data segment, such as data segment 353A, has been determined to be corrupted. Resetting or not setting the corruption flag indicates that the data segment associated with the corruption flag is not corrupt, not known to be corrupt, or has been repaired if it was previously identified as corrupt. It one embodiment, the corruption flag is stored in conjunction with or in association with a pointer to the data segment with which the corruption flag is associated.

Example Method for Repairing a Corrupt Data Segment Used by a De-Duplication Engine With reference to FIG. 4, flow diagram 400 illustrates example procedures used by various embodiments. Although a specific flow of procedures is disclosed in flow diagram 400, such a flow is provided as an example. That is, embodiments are well suited to performing various other procedures or variations of the procedures recited in flow diagram 400. It is appreciated that the procedures in flow diagram 400 may be performed in an order different than presented, and that not all of the procedures in flow diagram 400 may be performed in every embodiment.

Moreover, flow diagram 400 includes procedures that, in various embodiments, are carried out by a processor under the control of computer-readable and computer-executable instructions. The computer-readable and computer-executable instructions for executing the method and/or procedure illustrated by flow diagram 400 resides, for example, in any tangible computer-readable media, such as data storage features internal or external to storage system 101, volatile memory 508 (FIG. 5), and/or non-volatile memory 510 (FIG. 5). For example, in one embodiment, the computer-readable and computer-executable instructions, reside on computer-readable media such as a Read Only Memory (ROM) or firmware of a microcontroller or processor which, is/are used to perform the functions of, or operate in conjunction with, for example, de-duplication engine 110. In another example, such computer-readable and computer-executable instructions may reside on a computer-readable storage media such as a diskette (e.g., a Compact Disc Read Only Memory (CD-ROM)) used to control operation of a processor in a computer system (e.g., computer system 500) which is coupled with storage system 101 and/or de-duplication engine 110.

FIG. 4 shows a flow diagram 400 of an example method for repairing a corrupt data segment used by a de-duplication engine, according to an embodiment. Reference will be made to components/modules and portions of FIGS. 1, 2, and 3 to assist in the description of the procedures of the method illustrated by flow diagram 400.

At 410 of flow diagram 400, in one embodiment, the method identifies a data segment, indexed by a de-duplication index, as a corrupt data segment. What is meant by "indexed by a de-duplication index" is that the data segment is included in or referenced by a de-duplication index, such as de-duplication index 240, for use by a de-duplication engine in the process of de-duplicating other data segments. In one embodiment, this identification is performed by corrupt data identifier 210 of de-duplication engine 110. For example, with reference to FIG. 3, corruption flag setter 218 of corrupt data identifier 210 can set a flag, such as corruption flag 342A, to indicate that data segment 353A is corrupt. In one embodiment, such a flag or other marking or sign indicative of a data segment being corrupt is stored in a de-duplication index, such as de-duplication index 240, to indicate that a referenced or pointed to data segment is corrupt.

In one embodiment, determinations of whether or not a data segment is corrupt are made during normal, and perhaps randomly or sporadically occurring, accesses of a data segment which require re-hashing of the data segment as part of performing an integrity check on the data segment to determine if the data segment is corrupt. For example, an integrity check is or can be performed by de-duplication engine 110 each time an access of a data segment occurs or in accordance with certain types of accesses of the data segment. Some examples of the type of access with which an integrity check of a data segment is associated include, but are not limited to: an access prior to use of the data segment for de-duplicating an identical data segment; an access prior to re-constructing a de-duplicated data segment with the data segment; and/or an access prior to backing up data or transferring a de-duplicated data segment which references a data segment. In some embodiments, an integrity check can be performed by a dedicated integrity checker, such as data segment integrity checker 212. Data segment integrity checker 212 performs integrity checks which can be conducted according to a schedule, in reaction to an event or a trigger, or per some other pre-determined or user provided instruction.

As part of an integrity check of a data segment, whether performed by data segment integrity checker 212 or some other process or component, a data segment is re-hashed according to the same hash used to generate a stored and previously generated hash value which is associated with the data segment. The re-hashing produces a re-generated hash value. To determine if the data segment has changed, and is therefore corrupted in some manner, the re-generated hash of the data segment is compared with a previously stored hash that has been generated from the data segment. If the re-generated hash value matches the stored and previously generated hash value, then the data segment is not corrupt. If the re-generated hash value and the previously generated hash do not match, then a determination is made that the data segment is corrupt.

At 420 of flow diagram 400, in one embodiment, the method searches for a duplicate data segment with which to replace the corrupt data segment. The duplicate data segment comprises an uncorrupted version of the data segment which has been identified as being corrupted. In one embodiment, this searching is performed by corrupt data replacement searcher 220. Consider an example, in one embodiment, where corrupt data replacement searcher 220 notes an indication of corruption by from the presence of a flag, marker, or other indicia of data corruption placed in de-duplication index 240, such as a set corruption flag 342A. Following this example, corrupt data replacement searcher 220 accesses a data segment identifier, such as data segment identifier 341A, which is a hash value associated with and generated from data segment 353A. If for example data segment identifier 341A is a hash value comprising the binary value "1110001001001001001111100111100011," corrupt data replacement searcher 220 searches for another hash value which matches the value of data segment identifier 341A, as such a hash value will be associated with a duplicate data segment which is identical to an uncorrupted version of data segment 353A.

In one embodiment, corrupt data replacement searcher 220 monitors a data de-duplication process being conducted by de-duplication engine 110 to find a duplicate data segment with which to replace the corrupt data segment. If the data segment has previously been de-duplicated, then it is somewhat to very likely that a duplicate version of the data segment will appear in a data stream which is being de-duplicated.

In one embodiment, corrupt data replacement searcher 220 checks the de-duplication index to find a duplicate data segment with which to replace the corrupt data segment. Even in a de-duplication index which strives to maintain only references to unique data segments (e.g., only one reference to a particular data segment), there are situations where multiple references to identical data segments may exist within the de-duplication index. In one embodiment, a reference to the duplicate data segment being searched for can exist in the de-duplication index prior to an update of the de-duplication index which would clear repeated references to identical data segments. In one embodiment, a reference to the duplicate data segment being searched for may exist in the de-duplication index if the corrupt data segment was not in the de-duplication index when another copy of the data segment was stored. In one embodiment, a reference to the duplicate data segment being searched for may exist in the de-duplication index if index data was lost for any reason. The foregoing example situations are provided as non-limiting examples, as it is appreciated that there may be other situations in which a reference to a duplicate data segment may exist within a de-duplication index, such as de-duplication index 240.

In one embodiment, corrupt data replacement searcher 220 first checks a de-duplication index, and if a duplicate data segment is not found there, monitors a de-duplication process to find the duplicate data segment. In this manner, if a duplicate data segment is not found immediately in the de-duplication index, the corrupted data segment is still flagged to be repaired when a duplicate data segment is encountered in the future during de-duplication processing of received data 105 by de-duplication engine 110.

At 430 of flow diagram 400, in one embodiment, the method replaces the corrupt data segment with the duplicate data segment. For example, in one embodiment corrupt data replacer 230 performs this replacement to repair the corrupted data segment. Consider the previous example where a duplicate data segment to an uncorrupted version of data segment 353A was found by corrupt data replacement searcher 220. In one embodiment, corrupt data replacer 230 overwrites data segment 353A with the uncorrupted data of the duplicate data segment which was found. In another embodiment, the duplicate data segment is stored, such as in storage mechanism 120 or data segment storage 350, and corrupt data replacer 230 changes data segment pointer 340A to point the storage location of the duplicate data segment rather than to the storage location of data segment 353A.

Part of a de-duplication implementation involves maintaining a data structure for each data segment stored (i.e., the Binary Large OBject which contains the data which was split apart into a plurality of the data segments). This allows retrieving the entire binary large object from data storage. An example of a BLOB is a data file or block which is split into smaller data segments which comprises sub-blocks of the data file or block. In an embodiment where de-duplication engine 110 uses a cryptographic hash to identify the unique data segments stored from a BLOB, the techniques described herein can be utilized to similarly repair the BLOB itself if non data-segment corruption occurs to the BLOB (e.g., the list of data segments in the BLOB becomes corrupt). In the manner described above, the BLOB is indicated as corrupted, a search is conducted for a duplicate BLOB, and the BLOB is replaced with the duplicate BLOB.

Example Computer System Environment

FIG. 5 shows a block diagram of an example computer system 500 according to an embodiment. With reference now to FIG. 5, portions of the subject matter comprise or can comprise computer-readable and computer-executable instructions that reside, for example, in computer-usable media of a computer system. That is, FIG. 5 illustrates one example of a type of computer that can be used to implement embodiments of the subject matter which are discussed herein. FIG. 5 illustrates an example computer system 500 used in accordance with embodiments of the subject matter. It is appreciated that computer system 500 of FIG. 5 is an example, and that the subject matter can operate on or within a number of different computer systems including general purpose networked computer systems, embedded computer systems, optical computer systems, virtual computer systems, database systems, server devices, client devices, various intermediate devices/nodes, stand alone computer systems, and the like. As shown in FIG. 5, computer system 500 of FIG. 5 is well adapted to having peripheral computer readable media 502 such as, for example, a floppy disk and drive, a compact disc and drive, a digital versatile disk and drive, and the like coupled thereto.

Computer system 500 of FIG. 5 includes an address/data bus 504 for communicating information, and a processor 506A coupled to bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors.

Computer system 500 also includes data storage features such as a computer usable volatile memory 508, e.g. random access memory (RAM), coupled to bus 504 for storing information and instructions for processors 506A, 506B, and 506C. Computer system 500 also includes computer usable non-volatile memory 510, e.g. read only memory (ROM), coupled to bus 504 for storing static information and instructions for processors 506A, 506B, and 506C. Also present in computer system 500 is a data storage system 101 (e.g., one or more magnetic disks and drives, optical disks and drives, and/or solid state storage units such as flash memory) coupled to bus 504 for storing information and/or instructions.

Computer system 500 also includes, in one embodiment, an optional alphanumeric input device 514 including alphanumeric and function keys coupled to bus 504 for communicating information and command selections to processor 506A or processors 506A, 506B, and 506C. Computer system 500 also includes, in one embodiment, an optional cursor control device 516 coupled to bus 504 for communicating user input information and command selections to processor 506A or processors 506A, 506B, and 506C. Computer system 500 of the present embodiment also includes, in one embodiment, an optional display device 518 coupled to bus 504 for displaying information.

Referring still to FIG. 5, optional display device 518 may be a liquid crystal device, cathode ray tube, plasma display device or other display device suitable for creating, presenting, or displaying graphic images and/or symbols or alphanumeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, directional and input keys on a multimedia remote control, or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. Computer system 500 is also well suited to having a cursor directed by other means such as, for example, voice commands.

Computer system 500 also includes, in one embodiment, an I/O device 520 for coupling computer system 500 with external entities. For example, in one embodiment, I/O device 520 is a modem for enabling wired or wireless communications between computer system 500 and an external network such as, but not limited to, the Internet.

Referring still to FIG. 5, various other components are depicted for computer system 500 and may be included in various embodiments. Specifically, when present, an operating system 522, applications 524, modules 526, and data 528 are shown as typically residing in one or some combination of computer usable volatile memory 508, e.g. random access memory (RAM), and data storage system 101. In some embodiments, the subject matter discussed herein is stored, for example, as an application 524 or module 526 in memory locations within RAM 508, computer readable media within data storage system 101, and/or peripheral computer readable media 502.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for repairing a corrupt data segment used by a de-duplication engine, said method comprising:
   identifying a data segment, appearing in a first data stream and indexed by a de-duplication index, as a corrupt data segment;
   searching for a duplicate data segment with which to replace said corrupt data segment, said duplicate data segment comprising an uncorrupted version of said data segment, and wherein said searching for the duplicate data segment comprises monitoring a de-duplication process to identify the duplicate data segment in one or more data streams subsequent to the first data stream; and
   replacing said corrupt data segment with said duplicate data segment.

2. The method as recited in claim 1, wherein said identifying a data segment indexed by a de-duplication index as a corrupt data segment comprises:
   setting a corruption flag associated with said data segment.

3. The method as recited in claim 1, wherein said identifying a data segment indexed by a de-duplication index as a corrupt data segment further comprises:
   performing an integrity check on said data segment to determine if said data segment is corrupt; and
   in response to said data segment failing said integrity check; storing information to indicate said data segment is corrupt.

4. The method as recited in claim 3, wherein said performing an integrity check on said data segment comprises:
   producing a re-generated hash value of said data segment; and
   comparing said re-generated hash value of said data segment with a previously stored hash value of said data segment to determine if said data segment has changed.

5. The method as recited in claim 1, wherein said searching for a duplicate data segment with which to replace said corrupt data segment comprises:
   checking said de-duplication index to find said duplicate data segment.

6. A data de-duplication engine comprising:
   a corrupt data identifier configured for identifying a data segment appearing in a first data stream and indexed by a de-duplication index as a corrupt data segment in response to a failed integrity check of the data segment;
   a corrupt data replacement searcher configured for checking said de-duplication index and monitoring a data de-duplication process to find a duplicate data segment to said corrupt data segment either in said de-duplication index or during processing of data for de-duplication by identifying the duplicate data segment in one or more data streams subsequent to the first data stream, said duplicate data segment comprising an uncorrupted version of said data segment; and
   a corrupt data replacer configured for replacing said corrupt data segment with said duplicate data segment.

7. The de-duplication engine of claim 6, further comprising:
   said de-duplication index, wherein said de-duplication index comprises an index of data segment identifiers associated with a plurality of data segments which have been identified, and wherein said data segment comprises one of said plurality of data segments indexed by said de-duplication index.

8. The de-duplication engine of claim 7, wherein a data segment identifier of said data segment identifiers comprises a hash value.

9. The de-duplication engine of claim 6, wherein said data segment comprises a data sub-block.

10. The de-duplication engine of claim 6, wherein said data segment comprises a plurality of sub-blocks.

11. The de-duplication engine of claim 6, wherein said corrupt data identifier comprises:
    a data segment integrity checker configured for performing a scheduled integrity check on said data segment.

12. The de-duplication engine of claim 11, wherein said data segment integrity checker comprises:
    a hash generator for re-generating a hash value of said data segment; and
    a hash comparator for comparing a re-generated hash value of said data segment with a previously stored hash value of said data segment to determine if said data segment has changed.

13. The de-duplication engine of claim 6, wherein said corrupt data identifier comprises:
    a settable corruption flag associated with said data segment and said de-duplication index.

14. A data storage system comprising:
    at least one data storage mechanism; and
    a de-duplication engine, said de-duplication engine comprising:
       a corrupt data identifier configured for identifying a data segment appearing in a first data stream and indexed by a de-duplication index as a corrupt data segment in response to a failed integrity check of said data segment;
       a corrupt data replacement searcher configured for checking said index and monitoring a data de-duplication process to find a duplicate data segment to said corrupt data segment either in said de-duplication index or during processing of data for de-duplication by identifying the duplicate data segment in one or more data streams subsequent to the first data stream, said duplicate data segment comprising an uncorrupted version of said data segment; and
       a corrupt data replacer configured for replacing said corrupt data segment with said duplicate data segment.

15. The data storage system of claim 14, wherein said at least one data storage mechanism comprises:
    at least one hard disk drive.

16. The data storage system of claim 14, wherein said at least one data storage mechanism comprises:
    a redundant array of independent disks.

17. The data storage system of claim 14, wherein said at least one data storage mechanism comprises:
    a data cache.

18. The data storage system of claim 14, wherein said de-duplication engine further comprises:
    said de-duplication index, wherein said de-duplication index comprises an index of data segment identifiers associated with a plurality of data segments which have been identified, and wherein said data segment comprises one of said plurality of data segments indexed by said de-duplication index.

19. The data storage system of claim 14, wherein said de-duplication engine further comprises:
    a data segment integrity checker configured for performing a scheduled integrity check on said data segment.

20. A method for repairing a corrupt data segment used by a de-duplication engine, said method comprising:
  identifying a data segment, indexed by a de-duplication index, as a corrupt data segment;
  searching for a duplicate data segment with which to replace said corrupt data segment, said duplicate data segment comprising an uncorrupted version of said data segment; and
  replacing said corrupt data segment with said duplicate data segment; and
  wherein said searching for a duplicate data segment with which to replace said corrupt data segment comprises: checking said de-duplication index to find said duplicate data segment.

21. The method as recited in claim 20, wherein said identifying a data segment indexed by a de-duplication index as a corrupt data segment further comprises:
  performing an integrity check on said data segment to determine if said data segment is corrupt; and
  in response to said data segment failing said integrity check; storing information to indicate said data segment is corrupt.

22. The method as recited in claim 21, wherein said performing an integrity check on said data segment comprises:
  producing a re-generated hash value of said data segment; and
  comparing said re-generated hash value of said data segment with a previously stored hash value of said data segment to determine if said data segment has changed.

23. The method as recited in claim 20, wherein said searching for a duplicate data segment with which to replace said corrupt data segment comprises:
  monitoring a data de-duplication process to find said duplicate data segment.

* * * * *